United States Patent
Salehi et al.

(10) Patent No.: US 12,221,121 B2
(45) Date of Patent: Feb. 11, 2025

(54) ADJUSTMENT OF VEHICLE PLANNING PARAMETERS IN A DEGRADED DRIVING SITUATION

(71) Applicant: GM GLOBAL TECHNOLOGY OPERATIONS LLC, Detroit, MI (US)

(72) Inventors: Rasoul Salehi, Ann Arbor, MI (US); Sayyed Rouhollah Jafari Tafti, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 279 days.

(21) Appl. No.: 17/973,686

(22) Filed: Oct. 26, 2022

(65) Prior Publication Data

US 2024/0140449 A1 May 2, 2024

(51) Int. Cl.
*B60W 50/029* (2012.01)
*B60W 50/00* (2006.01)
*B60W 60/00* (2020.01)

(52) U.S. Cl.
CPC ........ *B60W 50/029* (2013.01); *B60W 60/001* (2020.02); *B60W 2050/0022* (2013.01); *B60W 2520/105* (2013.01); *B60W 2552/10* (2020.02); *B60W 2554/801* (2020.02); *B60W 2554/802* (2020.02); *B60W 2555/60* (2020.02)

(58) Field of Classification Search
CPC ............. B60W 50/029; B60W 60/001; B60W 2555/60; B60W 2554/802; B60W 2554/801; B60W 2552/10; B60W 2050/0022; B60W 2520/105
See application file for complete search history.

(56) References Cited

U.S. PATENT DOCUMENTS

| 2018/0203456 A1* | 7/2018 | Nagasaka | B60W 10/20 |
| 2018/0356819 A1* | 12/2018 | Mahabadi | B60W 30/00 |
| 2021/0114617 A1* | 4/2021 | Phillips | B60W 30/0956 |

* cited by examiner

*Primary Examiner* — James J Lee
*Assistant Examiner* — Steven Vu Nguyen
(74) *Attorney, Agent, or Firm* — Quinn IP Law (57) ABSTRACT

A system for planning motion of a vehicle includes a controller having a processor and tangible, non-transitory memory on which instructions are recorded. The vehicle is capable of an automated driving operation. A planning module is executable by the controller to generate a vehicle trajectory constrained by a set of planning parameters. During a degraded driving situation, an adjustment module is executable by the controller to generate at least one adjusted parameter in the set of planning parameters. The controller is adapted to register occurrence of the degraded driving situation when the planning module is unable to generate a feasible path for the vehicle constrained by the set of planning parameters. The planning module is adapted to generate a modified trajectory plan based on the at least one adjusted parameter, with the automated driving operation being based on the modified trajectory plan during the degraded driving situation.

14 Claims, 5 Drawing Sheets

ADJUSTMENT OF VEHICLE PLANNING PARAMETERS IN A DEGRADED DRIVING SITUATION

INTRODUCTION

The present disclosure relates generally to a system and method for adjusting vehicle planning parameters in degraded driving situations. An autonomous vehicle may navigate through its environment using sensors to detect objects and guided by a vehicle planning algorithm for planning its trajectory. However, in certain situations the vehicle planning algorithm may be unable to find a feasible path or trajectory that satisfies its predefined set of parameters and boundary conditions. Some examples of such situations include construction zones with changed rules of road, congested scenarios where neighboring vehicles do not follow safe headways and chaotic scenarios where actors break the rules of the road.

SUMMARY

Disclosed herein is a system for planning motion of a vehicle. The system includes a controller having a processor and tangible, non-transitory memory on which instructions are recorded. The vehicle is capable of an automated driving operation. A vehicle planning module is executable by the controller to generate a trajectory plan constrained by a set of planning parameters. During a degraded driving situation, an adjustment module is executable by the controller to generate at least one adjusted parameter in the set of planning parameters. The controller is adapted to register occurrence of the degraded driving situation when the vehicle planning module is unable to generate a feasible path for the vehicle constrained by the set of planning parameters.

The planning module is adapted to plan for a modified vehicle trajectory based on the at least one adjusted parameter. The automated driving operation is based on the modified trajectory plan during the degraded driving situation. The automated driving operation is adapted to discontinue using the modified trajectory plan once a feasible path is found using a nominal set of planning parameters by the vehicle planner module.

The adjusted parameter may include an adjacent lane parameter and/or a double lane crossing parameter. The adjusted parameter may include a minimum lateral distance and/or a minimum longitudinal gap between the vehicle and a neighboring vehicle. The adjusted parameter may include a maximum speed limit, a maximum acceleration during a vehicle maneuver and a minimum acceleration during the vehicle maneuver.

In some embodiments, a root cause module is executable by the controller to determine at least one root cause for a solution failure of the vehicle planning module. A database may be accessible to the controller. At least one root cause for a solution failure of the vehicle planning module may be obtained through comparison of the degraded driving situation with stored data in the database. The controller may be adapted to store the modified subset and features of the degraded driving situation in the database as a learning dataset.

In some embodiments, the set of planning parameters are divided into a primary list and a secondary list having respective weighting factors, the primary list being prioritized for adjustment over the secondary list. The controller may be adapted to maximize a utility function based on the primary list, the secondary list, the respective weighting factors, a nominal value of the at least one adjusted parameter and a value function outputted by the vehicle planning module.

The utility function may be defined as: $G = V - \alpha_1[\Theta_{prime} - \Theta_{0,\ prime}]^2 - \alpha_2[\Theta_{second} - \Theta_{0,second}]^2$, where $V$ is the value function, $\alpha_1$ and $\alpha_2$ are the respective weighting factors, $\Theta_{prime}$ denotes an adjusted parameter in the primary list, $\Theta_{second}$ denotes the adjusted parameter in the secondary list, $\Theta_{0,\ prime}$ denotes the nominal value of the adjusted parameter in the primary list and $\Theta_{0,second}$ denotes the nominal value of the adjusted parameter in the secondary list.

Disclosed herein is a method of planning the motion of a vehicle with a controller having a processor and tangible, non-transitory memory on which instructions are recorded. The method includes generating a trajectory plan based in part on a set of planning parameters via execution of a vehicle planning module by the controller, the vehicle being capable of an automated driving operation. The method includes designating occurrence of a degraded driving situation when the planning module is unable to generate a feasible path for the vehicle based on the predefined set of planning parameters. The method includes generating at least one adjusted parameter in the set of planning parameters during the degraded driving situation and generating a modified trajectory plan based on the at least one adjusted parameter, via the vehicle planning module. The automated driving operation is based on the modified trajectory plan during the degraded driving situation.

The above features and advantages and other features and advantages of the present disclosure are readily apparent from the following detailed description of the best modes for carrying out the disclosure when taken in connection with the accompanying drawings.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Figure 1:
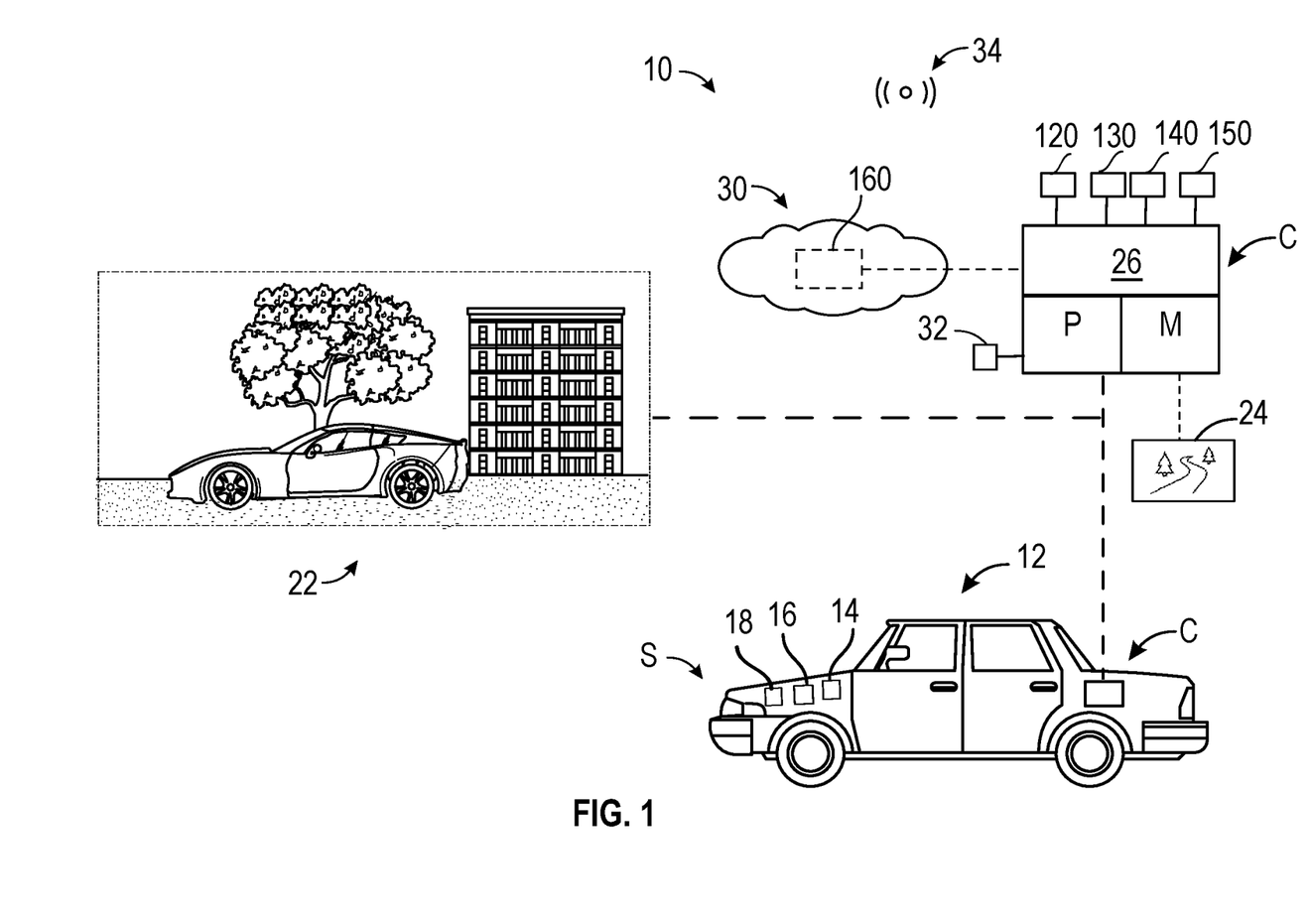
FIG. 1 is a schematic fragmentary diagram of a system for planning and controlling motion in a vehicle.

Referring to the drawings, wherein like reference numbers refer to like components, FIG. 1 schematically illustrates a system 10 for planning motion in a vehicle 12 that is capable of automated driving operation. The vehicle 12 may include, but is not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), boat, plane, train or another moving platform. The vehicle 12 may be an electric vehicle. The vehicle 12 may be part of a fleet of autonomous vehicles. It is to be understood that the vehicle 12 may take many different forms and have additional components.

Referring to FIG. 1, the vehicle 12 includes one or more sensors S for perceiving the surrounding environment. The sensors may include a radar unit 14, a lidar unit 16 and a camera 18. The sensors may include a navigation sensor (e.g., GPS) and an inertial measurement unit. It is understood that the sensors S may incorporate other types of technologies available to those skilled in the art. As the vehicle 12 navigates through or observes a scene 22, data from the sensors S is transmitted to a vehicle planning module 120, which generates a trajectory plan 24 for the vehicle 12.

Referring to FIG. 1, the system 10 includes a controller C that executes an automated driving operation 26 for the vehicle 12 based on the trajectory plan 24. The trajectory plan 24 guides the motion of the vehicle 12 and determines the appropriate steps for navigating traffic signs, intersections, various road and traffic conditions. As part of determining the trajectory plan 24, each level of the vehicle planning module 120 incorporates different sets of constraints, such as reward constants, filter thresholds, behavioral/comfort constraints, etc.

For example, the constraints may include a minimum horizon length for the vehicle 12, a minimum acceptable headway distance between the vehicle 12 and other vehicles, restriction on crossing lane markings (solid line and opposite lane), minimum lateral distance between vehicles, distance from occluded objects and other factors. The parameters and constraints limit the set of feasible solutions available to the vehicle planning module 120. In certain situations, the vehicle planning module 120 may be unable to find a feasible path or trajectory that satisfies each of these constraints.

Referring to FIG. 1, the controller C has at least one processor P and at least one memory M (or non-transitory, tangible computer readable storage medium) on which instructions are recorded for a method 200 (described below with respect to FIG. 3) for controlling operation of the vehicle 12 in a degraded driving situation. The memory M can store command unit-executable instruction sets, and the processor P can execute the command unit-executable instruction sets stored in the memory M.

Figure 5:
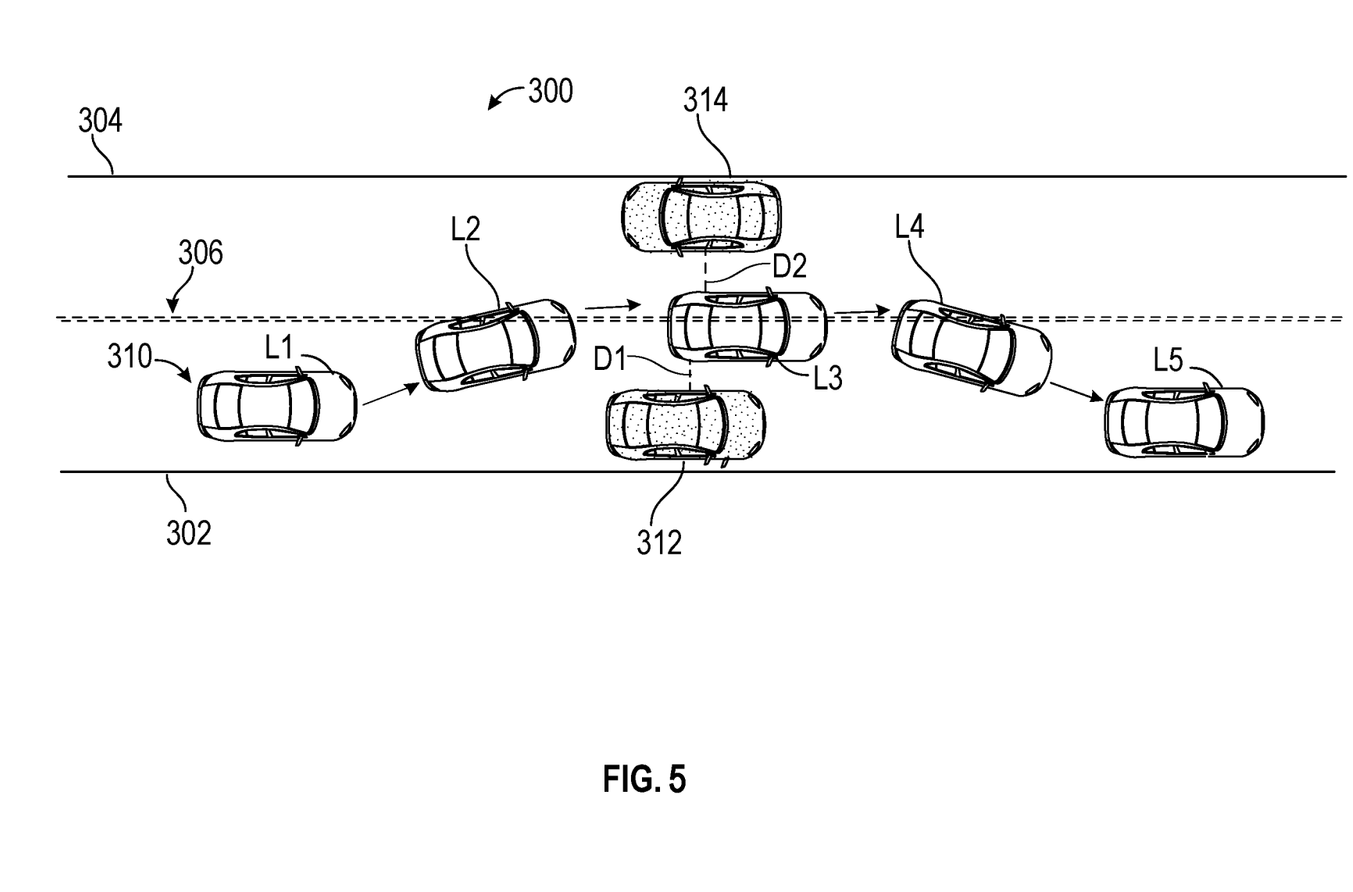
FIG. 5 is a schematic fragmentary diagram illustrating an example degraded situation faced by a vehicle.

The degraded driving situation is defined to be when the vehicle planning module 120 is unable to find a feasible solution for navigating the driving situation ahead due to deviation from normal conditions in either the vehicle 12 or its surrounding environment. The degraded driving situations may vary depending on the specific constraints of the vehicle planning module 120. Some examples of degraded driving situations include construction zones with changed rules of road, congested scenarios where neighboring vehicles do not follow safe headways and chaotic scenarios where actors break the rules of the road. An example of a degraded situation 300 is shown in FIG. 5.

As described below, the system 10 finds the root cause for the solution failure and temporarily adjusts or adapts a subset of the planning parameters in order to find a safe solution or feasible path for the degraded driving situation. The subset may include one or more adjusted parameters. This provides the benefit of increasing the domain of operation of the vehicle planning module 120 without major software or hardware updates.

Referring to FIG. 1, the controller C is in communication with a remotely located cloud computing service 30. The cloud computing service 30 may include one or more remote servers hosted on the Internet to store, manage, and process data. The cloud computing service 30 may be at least partially managed by personnel at various locations. The vehicle 12 may include a telematics module 32 for establishing two-way communications with the cloud computing service 30, shown in FIG. 1. The telematics module 32 may collect telemetry data, such as location, speed, powertrain data, maintenance requirements and servicing, by interfacing with various internal sub-systems of the vehicle 12. The telematics module 32 may enable vehicle-to-vehicle communication (V2V) and/or a vehicle-to-everything communication (V2X).

Figure 2:
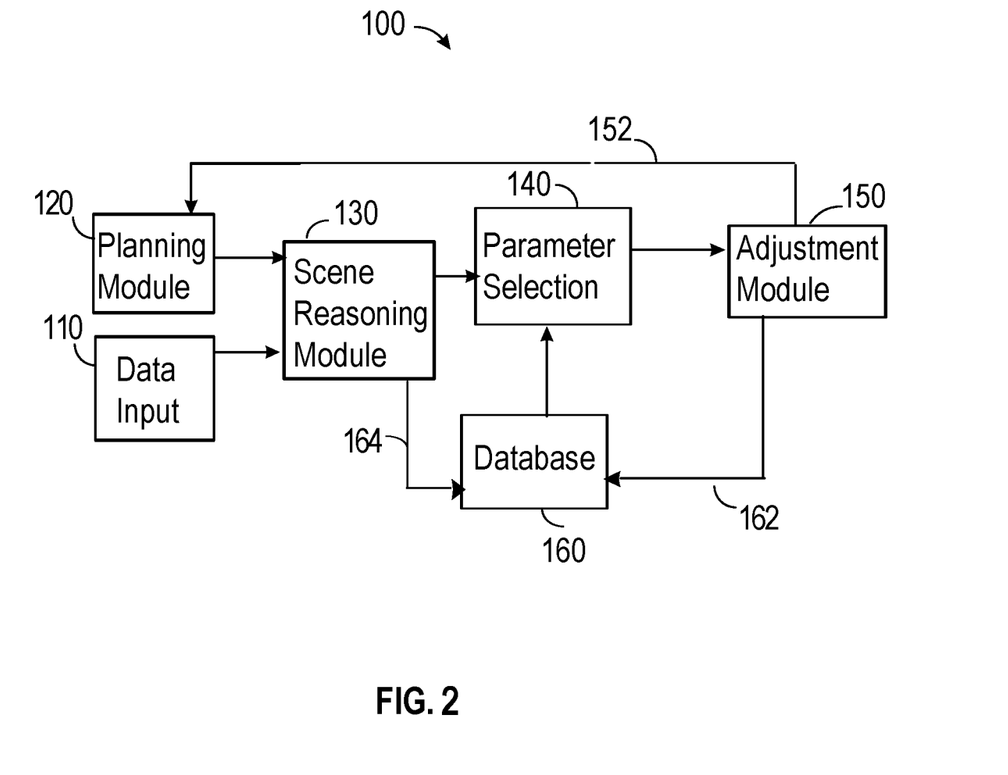
FIG. 2 is a schematic diagram of an example modular architecture employable system of FIG. 1.

An example modular architecture 100 for the system 10 is shown in FIG. 2. It is understood that other configurations may be employed. As shown in FIG. 2, information from an input module 110 is transmitted to a scene reasoning module 130. The input module 110 provides perception, localization, mapping and sensor data. The input includes both static and dynamic scene information. The scene reasoning module 130 also receives input from the vehicle planning module 120. As described in detail below with respect to FIG. 4, the scene reasoning module 130 analyzes the detected scene to ascertain the root cause of failure, i.e., why the vehicle planning module 120 is unable to find a feasible solution.

Referring to FIG. 2, the output of the scene reasoning module 130 is transmitted to a parameter selection function 140 which selects a subset of the planning parameters to be targeted for adjustment or adaptation. The selected subset of parameters is sent to the parameter adjustment module 150 which adjusts, modifies or adapts the selected subset of parameters. The adjusted parameters are relayed back to the vehicle planning module 120 (as indicated by line 152) which updates the trajectory plan 24 to a modified trajectory plan based on the adjusted parameters.

Referring to FIG. 2, the output of the scene reasoning module 130 and the adjustment module 150 are transmitted (as indicated by line 162 and line 164, respectively) to a database 160 which stores these parameters and their corresponding situations or scenes as a learning dataset for future use. The database 160 enables matching of the detected scene with similar stored scenarios (observed by other vehicles) and providing the right subset of parameters to adapt or modify from their initial or nominal value. The data from the database 160 may be employed by the scene reasoning module 130 and the parameter selection function 140.

Figure 3:
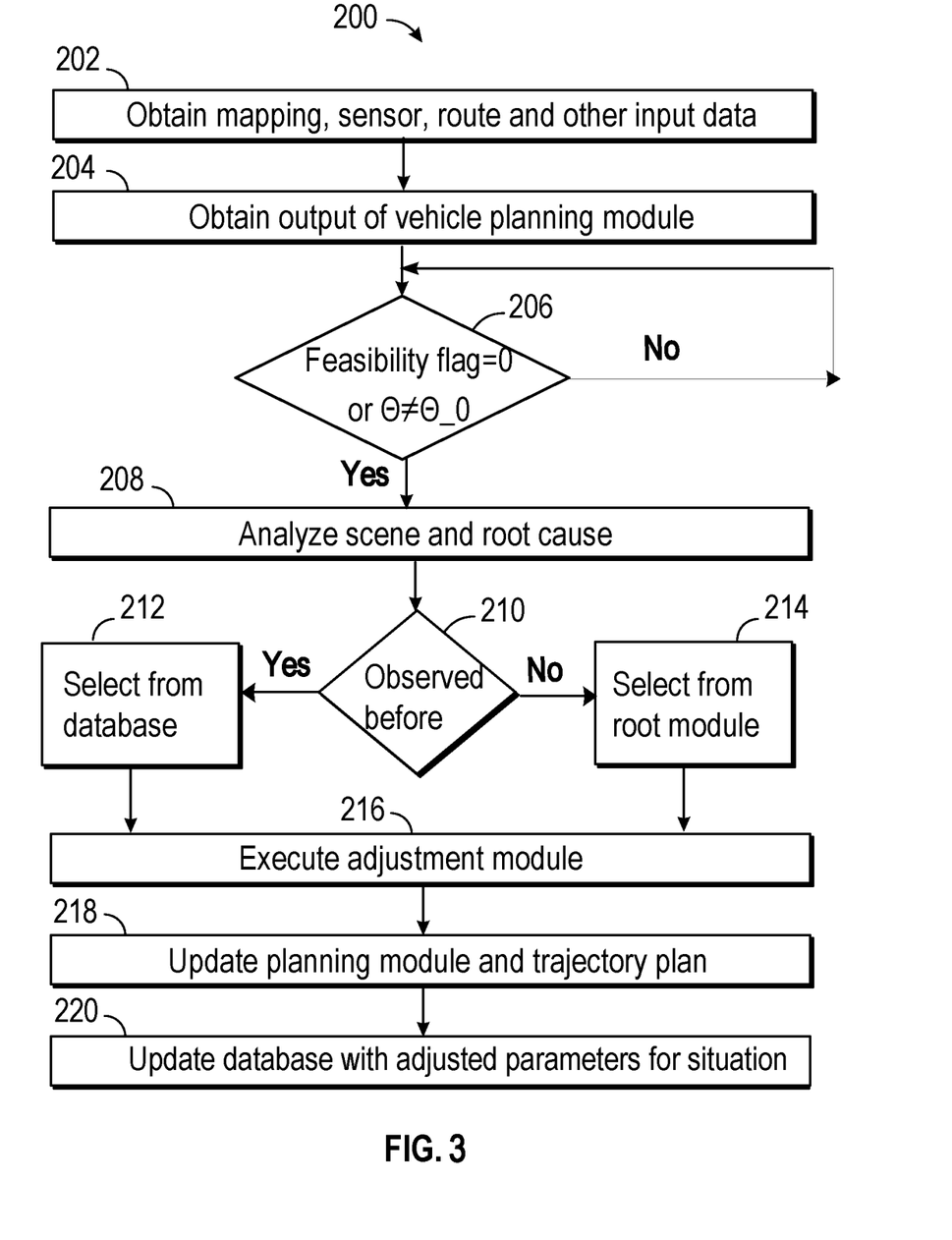
FIG. 3 is a flowchart for a method of operating the system of FIG. 1.

Referring now to FIG. 3, a flowchart of an example method 200 of operating the system 10 is shown. Method 200 may be embodied as computer-readable code or instructions stored on and at least partially executable by the controller C. Method 200 need not be applied in the specific order recited herein. Furthermore, it is to be understood that some blocks or steps may be eliminated. Method 200 may be executed in real-time, continuously, systematically, sporadically and/or at regular intervals, for example, each 10 milliseconds during normal and ongoing operation of the vehicle 12.

Beginning at block 202 of FIG. 3, the method 200 includes obtaining input data, such as mapping, localization, sensor/perception and geographical route data. Advancing to block 204, the method 200 includes retrieving the output of the vehicle planning module 120.

Proceeding to block 206, the controller C is executed to determine whether there is a feasible trajectory or path for the vehicle 12 to proceed based on the current input parameters and nominal sets of parameters. This may be represented by the state of a feasibility flag, which is set to zero when there is no feasible trajectory and set to one when there exists a feasible trajectory. Block 206 may apply a condition check ($\Theta \neq \Theta_0$), to determine if the current set of parameters ($\Theta$) have been adapted and not equal to the nominal set of parameters ($\Theta_0$). This condition check ensures that, after each adaption occurs, the parameter values are returned back to their original or nominal values as soon as the degraded situation is over.

If there is a feasible trajectory or solution (block 206=NO, feasibility flag=1 or $\Theta=\Theta_0$), the method 200 loops back. If there is no feasible trajectory or solution (block 206=YES, feasibility flag=0 or $\Theta \neq \Theta_0$) the method 200 advances to block 208. Per block 208, the controller C is adapted to analyze the scene 22 faced by the vehicle 12, which may be done by executing the scene reasoning module 130. The scene reasoning module 130 detects root causes for the degraded driving situation and creates a map between the detected root cause and the constraints that are blocking the solution (of finding a feasible trajectory plan).

Figure 4:
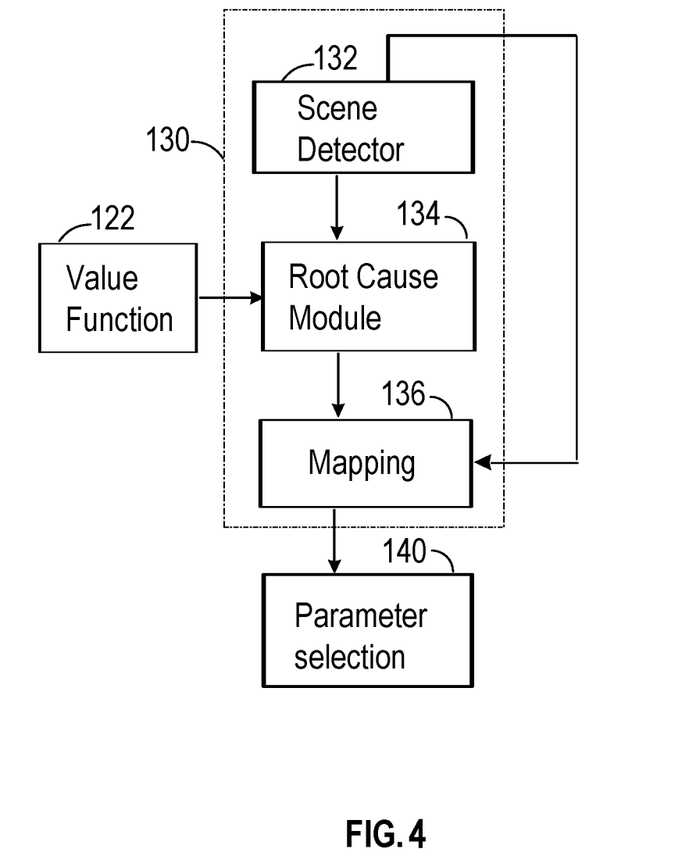
FIG. 4 is a flowchart of a portion of the method of FIG. 3.

FIG. 4 shows an example execution of the scene reasoning module 130, which includes a scene detector 132, a root cause module 134 and a mapping function 136. The scene detector 132 observes features (based on the input data) and estimates or predicts situations the vehicle 12 may face, such as a left turn, a lane merge, city cruising, passing a parked object in neighborhood driving etc. The scene detector 132 may employ an object detection neural network or other technology available to those skilled in the art.

Referring to FIG. 4, the root cause module 134 assesses and identifies the root cause of the solution failure, such as an occluded intersection, a short gap, blocked road with a low lateral gap, insufficient lateral clearance and etc. In addition to the input from the scene detector module 132, the root cause module 134 utilizes the components of the reward or cost function (represented by value function 122 in FIG. 4) from the planning module 120 which resulted in the failure in finding a feasible solution. For example, a high collision component in the value function may indicate that a possible root cause for failure is that there is no acceptable lateral or longitudinal clearance with other objects in the scene. The root cause module 134 may employ a physics-based model, a deep learning module, or other machine learning algorithm to ascertain the root cause. Referring to FIG. 4, the mapping function 136 maps the detected root cause with parameters that may be adjusted or adapted. A sensitivity analysis may be conducted to determine correlation or connection of the scene features to the selected parameter space.

The parameters that may be adjusted include a horizon length over the field-of-view, minimum longitudinal gap between vehicles, acceptable headway distance between vehicles, crossing lane markings (solid line and opposite lane), allowable speed range, maximum acceleration during a vehicle maneuver (e.g., turning), minimum acceleration during a vehicle maneuver, minimum lateral distance between vehicles and minimum distance from occluded objects. The output of the scene reasoning module 130 is sent to the parameter selection function 140.

Proceeding to block 210, the controller C is adapted to determine if the degraded situation has been observed before. If the degraded situation has been observed before (block 210=YES), the method 200 advances to block 212 to pull the subset of parameters for similar edge cases from the database 160 or cloud computing service 30 or other source.

If the degraded situation has not been observed before (block 210=NO), the method 200 advances to block 214 where the controller C selects the subset of parameters to be adjusted based on the output of the root cause module 134. It is understood that a combination of stored data and output from the root cause module 134 may be employed regardless of whether elements of the scene 22 have been observed before.

From blocks 212 and 214, the method 200 advances to block 216 where the initial value for the selected parameters is selected and the parameter adjustment module 150 is executed. The controller C may be adapted to divide the set of planning parameters into a primary list of adjustment parameters and a secondary list of adjustment parameters, with weighting factors to create priority in terms of adjustment of parameters. The primary list of adjustment parameters is adjusted first before the secondary set of adjustment parameters. The primary list of adjustment parameters may have a lower cost on performance. For example in a blocked road scenario, maintaining a safe distance may be prioritized over the restriction on going into an adjacent lane.

The parameter adjustment module 150 may maximize a utility function G in an iterative process. The utility function G is based on the primary list, the secondary list, the respective weighting factors, a nominal value of adjusted parameters in normal conditions and a value function outputted by the vehicle planning module 120. The utility function G may be defined as:

$$\text{Argmax } G = V - \alpha_1 [\Theta_{prime} - \Theta_{0,prime}]^2 - \alpha_2 [\Theta_{second} - \Theta_{0,second}]^2.$$

Here V is the value function, $\alpha_1$ and $\alpha_2$ are respective weighting factors for the primary list and the secondary list, $\Theta_{prime}$ denotes an adjusted parameter in the primary list, $\Theta_{second}$ denotes an adjusted parameter in the secondary list, $\Theta_{0,\,prime}$ denotes a nominal value (i.e., unadjusted or in normal situations) of the adjusted parameter in the primary list and $\Theta_{0,second}$ denotes the nominal value of the adjusted parameter in the secondary list. Here $\alpha_2$ is greater than $\alpha_1$ ($\alpha_2 > \alpha_1 > 0$). In one example, the value function is calculated by the planning module 120 based on the vehicle state S, the current parameter set $\Theta_{set}(k)$, at the parameter adaption step of k. Here, $S_{ref}$ is a reference vehicle state such that $V = F_{planner}(S, S_{ref}, \Theta_{set})$ Comfort may be added into the cost function explicitly or may be integrated into the value function (V). If the optimization terminates with no solution, a failure message is communicated to the vehicle user.

Proceeding to block 218, the adjusted set of parameters is used to update the vehicle planning module 120 and generate a modified vehicle trajectory. The automated driving operation 26 is carried out based on the modified vehicle trajectory. Advancing to block 220, the controller C is adapted to update the database 160 with the adjusted parameters. The controller C may generate a diagnostic report summarizing the degraded situations as well as provide dashboard notification.

Referring now to FIG. 5, an example of a degraded situation 300 faced by an ego vehicle 310 is shown. The ego vehicle 310 in FIG. 5 is positioned in a first lane 302 in an initial location L1. The first lane 302 is adjacent to an opposing second lane 304 and separated by a divider or lane markings 306. Referring to FIG. 5, a first stalled vehicle 312 is in the first lane 302 and a second stalled vehicle 314 is in the opposing second lane 304.

The respective positions of the first stalled vehicle 312 and the second stalled vehicle 314 are such that there is insufficient lateral clearance or corridor for the ego vehicle 310 to pass through without crossing the lane markings 306 and going into the opposing second lane 304. Thus, the planning module (e.g., vehicle planning module 120 shown in FIG. 2) of the ego vehicle 310 is unable to generate a feasible solution or path in the prediction horizon and the feasibility flag is set to zero.

Upon analysis of the root cause, the following subset of planning parameters is selected for adjustment: the safe distance parameter ($C_{safe\_distance}$) that requires a minimum distance to obstacles and the binary (i.e., either ON or OFF) lane marking and opposing lane parameters ($C_{lane\_marking}$, $C_{opposing\_lane}$) that prevent lane crossing.

While the degraded situation 300 is active (feasibility flag remains zero), the parameters are adjusted as follows: the safe distance parameter ($C_{safe\_distance}$) is changed from 1.0 to 0.5 and the binary lane marking and opposing lane parameters ($C_{lane\_marking}$, $C_{opposing\_lane}$) are both turned off. Hence the ego vehicle 310 in the second location L2, the third location L3 and the fourth location L4 is allowed to cross the lane markings 306 into the opposing second lane 304 and maintain a reduced lateral distance (D1, D2) to the vehicles 312, 314, respectively, then it normally would.

Referring to FIG. 5, in the fifth location L5 of the ego vehicle 310, the degraded situation 300 has ended and the parameters are returned to the nominal setting where the safe distance parameter ($C_{safe\_distance}$) is reset to 1 and the lane marking and opposing lane parameters ($C_{lane\_marking}$, $C_{opposing\_lane}$) are turned back on. The reward components for the factors of comfort and time to destination may be set or predefined by the controller C.

In summary, system 10 locates a subset of planning parameters used by the vehicle planning module 120 based on the root cause for planner failure in a degraded driving situation. The system 10 enables adjustment of the vehicle planning parameters in a robust way, by relaxing the constraints temporarily without changing the planning module 120 itself. Finally, a process is provided for storing the adapted parameters and corresponding scenarios in a database 160 (e.g., on cloud server) and downloading them for future use cases.

Referring to FIG. 1, a wireless network 34 may be utilized for communications between the controller C and cloud computing service 30. The wireless network 34 may be a short-range network or a long-range network. The wireless network 34 may be a communication BUS, which may be in the form of a serial Controller Area Network (CAN-BUS). The wireless network 34 may be a serial communication bus in the form of a local area network. The local area network may include, but is not limited to, a Controller Area Network (CAN), a Controller Area Network with Flexible Data Rate (CAN-FD), Ethernet, Bluetooth, WIFI and other forms of data. The wireless network 34 may be a Wireless Local Area Network (LAN) which links multiple devices using a wireless distribution method, a Wireless Metropolitan Area Network (MAN) which connects several wireless LANs or a Wireless Wide Area Network (WAN) which covers large areas such as neighboring towns and cities. Other types of network technologies or communication protocols available to those skilled in the art may be employed.

The controller C of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a group of files in a file rechargeable energy storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowcharts illustrate an architecture, functionality, and operation of possible implementations of systems, methods, and computer program products of various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based storage systems that perform the specified functions or acts, or combinations of specific purpose hardware and computer instructions. These computer program instructions may also be stored in a computer-readable medium that may direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used here indicates at least variations that may arise from ordinary methods of measuring and using such parameters. In addition, disclosure of ranges includes disclosure of each value and further divided ranges within the entire range.

Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for planning motion of a vehicle, the system comprising:
    a controller having a processor and tangible, non-transitory memory on which instructions are recorded, the vehicle being capable of an automated driving operation;
    a vehicle planning module executable by the controller to generate a trajectory plan constrained by a set of planning parameters;
    an adjustment module executable by the controller to generate at least one adjusted parameter in the set of planning parameters during a degraded driving situation;
    wherein the controller is adapted to:
        register occurrence of the degraded driving situation when the vehicle planning module is unable to generate a feasible path for the vehicle constrained by the set of planning parameters;
        divide the set of planning parameters into a primary list and a secondary list having respective weighting factors, the primary list being prioritized for adjustment over the secondary list;
        maximize a utility function based on the primary list, the secondary list, the respective weighting factors, a nominal value of the at least one adjusted parameter and a value function generated by the vehicle planning module;
    wherein the vehicle planning module is adapted to generate a modified trajectory plan based on the at least one adjusted parameter, the automated driving operation being based on the modified trajectory plan during the degraded driving situation; and
    wherein the controller is adapted to discontinue using the modified trajectory plan in the automated driving operation once a feasible path is found using a nominal set of planning parameters by the vehicle planner module.

2. The system of claim 1, wherein the at least one adjusted parameter includes an adjacent lane parameter and/or a double lane crossing parameter.

3. The system of claim 1, wherein the at least one adjusted parameter includes a minimum lateral distance and/or a minimum longitudinal gap between the vehicle and a neighboring vehicle.

4. The system of claim 1, wherein the at least one adjusted parameter includes a maximum speed limit, a maximum acceleration during a vehicle maneuver and a minimum acceleration during the vehicle maneuver.

5. The system of claim 1, further comprising:
    a root cause module executable by the controller to determine at least one root cause for a solution failure of the vehicle planning module.

6. The system of claim 1, further comprising:
    a database accessible to the controller, wherein at least one root cause for a solution failure of the vehicle planning module is obtained through comparison of the degraded driving situation with stored data in the database.

7. The system of claim 6, wherein the controller is adapted to store the at least one adjusted parameter and features of the degraded driving situation in the database as a learning dataset.

8. The system of claim 1, wherein the utility function is defined as:
    $G = V - \alpha_1 [\Theta_{prime} - \Theta_{0,prime}]^2 - \alpha_2 [\Theta_{second} - \Theta_{0,second}]^2$, where V is the value function, $\alpha_1$ and $\alpha_2$ are the respective weighting factors, $\Theta_{prime}$ denotes an adjusted parameter in the primary list, $\Theta_{second}$ denotes the adjusted parameter in the secondary list, $\Theta_{0,prime}$ denotes the nominal value of the adjusted parameter in the primary list and $\Theta_{0,second}$ denotes the nominal value of the adjusted parameter in the secondary list.

9. A method of planning motion of a vehicle with a controller having a processor and tangible, non-transitory memory on which instructions are recorded, the method comprising:
    generating a trajectory plan based in part on a set of planning parameters via execution of a vehicle planning module by the controller, the vehicle being capable of an automated driving operation;
    designating occurrence of a degraded driving situation when the planning module is unable to generate a feasible path for the vehicle based on the predefined set of planning parameters;
    generating at least one adjusted parameter in the set of planning parameters during the degraded driving situation;
    dividing the set of planning parameters into a primary list and a secondary list having respective weighting factors, the primary list being prioritized for adjustment over the secondary list via the controller;
    maximizing a utility function based on the primary list, the secondary list, the respective weighting factors, a nominal value of the adjusted subset of planning parameters and a value function outputted by the vehicle planning module, via the controller;
    generating a modified trajectory plan based on the at least one adjusted parameter, via the vehicle planning module, the automated driving operation being based on the modified trajectory plan during the degraded driving situation; and
    discontinuing using the modified trajectory plan in the automated driving operation once a feasible path is found using a nominal set of planning parameters by the vehicle planner module.

10. The method of claim 9, further comprising:
    defining the utility function as $G = V - \alpha_1[\Theta_{prime} - \Theta_{0,prime}]^2 - \alpha_2[\Theta_{second} - \Theta_{0,second}]^2$, where V is the value function, $\alpha_1$ and $\alpha_2$ are the respective weighting factors, $\Theta_{prime}$ denotes an adjusted parameter in the primary list, $\Theta_{second}$ denotes the adjusted parameter in the secondary list, $\Theta_{0,prime}$ denotes a nominal value of the adjusted parameter in the primary list and $\Theta_{0,second}$ denotes the nominal value of the adjusted parameter in the secondary list.

11. A vehicle comprising:

a controller having a processor and tangible, non-transitory memory on which instructions are recorded, the vehicle being capable of an automated driving operation;

a vehicle planning module executable by the controller to generate a trajectory plan constrained by a set of planning parameters;

an adjustment module executable by the controller to generate at least one adjusted parameter in the set of planning parameters during a degraded driving situation;

wherein the controller is adapted to:
  register occurrence of the degraded driving situation when the planning module is unable to generate a feasible path for the vehicle constrained by the set of planning parameters;
  divide the set of planning parameters into a primary list and a secondary list having respective weighting factors, the primary list being prioritized for adjustment over the secondary list; and
  maximize a utility function based on the primary list, the secondary list, the respective weighting factors, a nominal value of the at least one adjusted parameter and a value function generated by the vehicle planning module;

wherein the vehicle planning module is adapted to generate a modified trajectory plan based on the at least one adjusted parameter, the automated driving operation being based on the modified trajectory plan during the degraded driving situation; and wherein the controller is adapted to discontinue using the modified trajectory plan in the automated driving operation once a feasible path is found using a nominal set of planning parameters by the vehicle planner module.

12. The vehicle of claim 11, wherein the at least one adjusted parameter includes an adjacent lane parameter and a double lane crossing parameter.

13. The vehicle of claim 11, wherein the at least one adjusted parameter includes a minimum lateral distance between the vehicle and a neighboring vehicle, a maximum speed limit, a maximum acceleration during a vehicle maneuver and a minimum acceleration during the vehicle maneuver.

14. The vehicle of claim 11, further comprising:
  a database accessible to the controller;
  wherein the controller is adapted to obtain at least one root cause for a solution failure of the vehicle planning module through comparison of the degraded driving situation with stored data in the database; and
  wherein the controller is adapted to store the at least one adjusted parameter and features of the degraded driving situation in the database as a learning dataset.

* * * * *